J. F. O'CONNOR.
COMBINED SPRING AND FRICTION BUFFER FOR RAILWAY CARS.
APPLICATION FILED FEB. 1, 1911.
992,441.
Patented May 16, 1911.
2 SHEETS—SHEET 1.
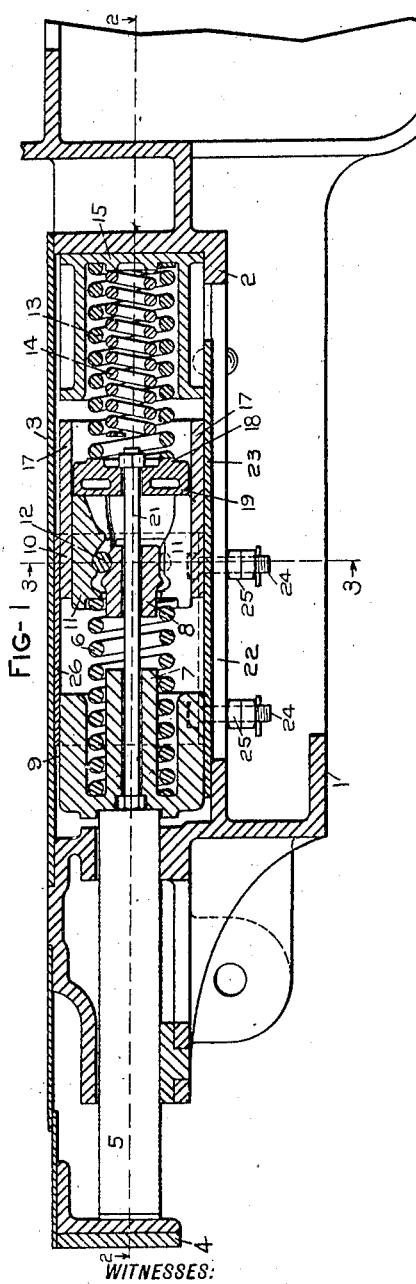
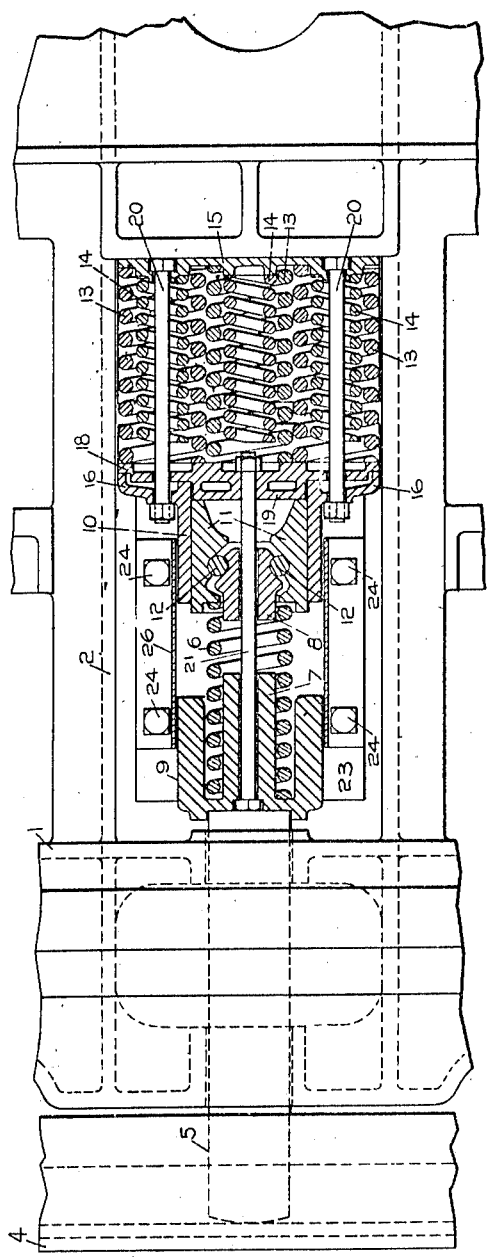
WITNESSES:
Calvin B. Patch
Esther Abrams.
INVENTOR
John F. O'Connor.
BY Munday, Evarts,
Adcock & Clarke
HIS ATTORNEYS

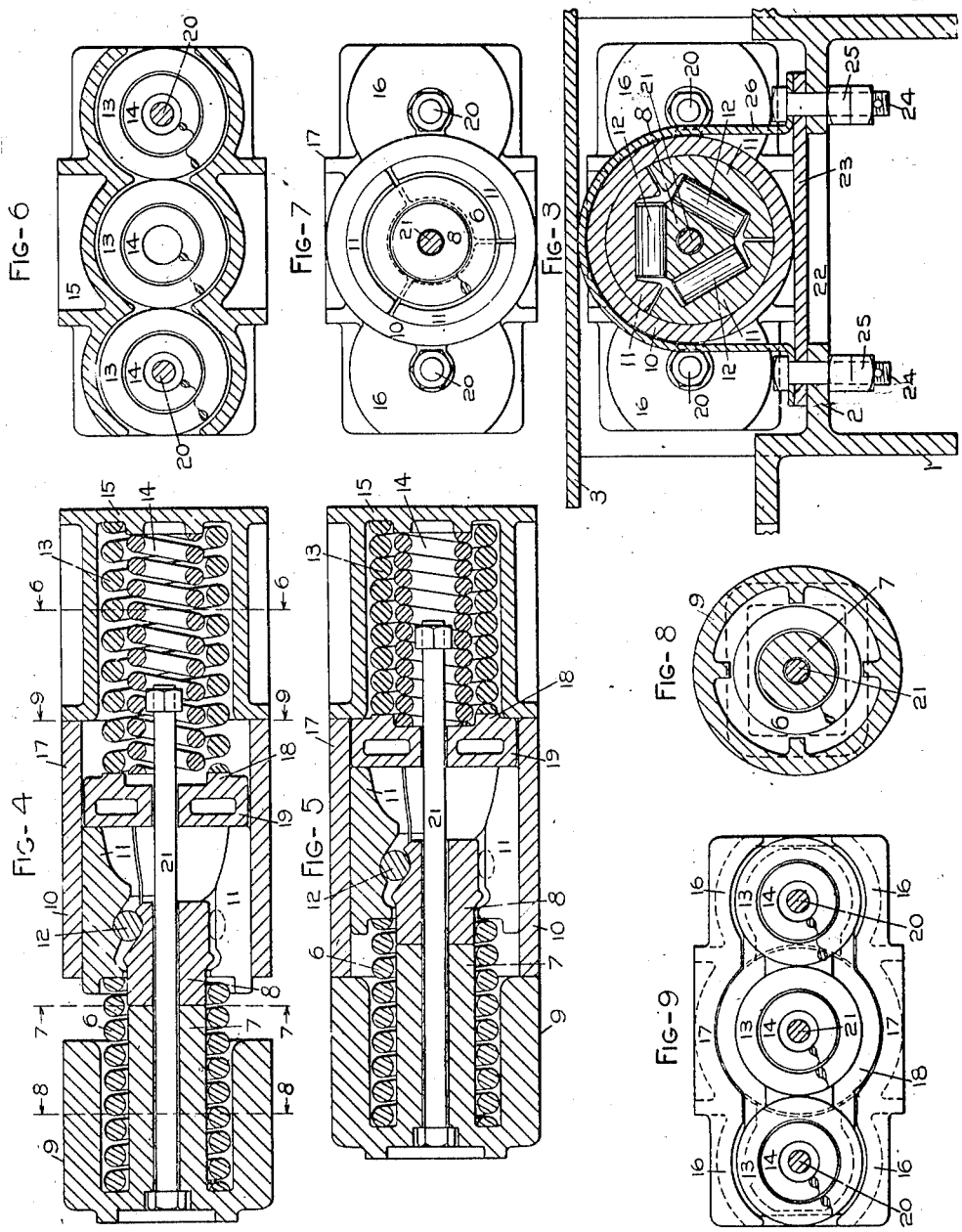

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

COMBINED SPRING AND FRICTION BUFFER FOR RAILWAY-CARS.

992,441.  Specification of Letters Patent.  Patented May 16, 1911.

Application filed February 1, 1911. Serial No. 605,845.

*To all whom it may concern:*

Be it known that I, JOHN F. O'CONNOR, a citizen of the United States, residing in Chicago, in the county of Cook and State of Illinois, have invented a new and useful Improvement in Combined Spring and Friction Buffers for Railway-Cars, of which the following is a specification.

My invention relates to improvements in combined spring and friction buffers for railway passenger cars.

The object of my invention is to produce a combined spring and friction buffer of a strong, simple, efficient and durable construction that will provide for the necessary extended movement of the buffer bar, say $5\frac{1}{2}$ inches, that will be sensitive to and properly cushion light shocks, and also efficiently cushion medium and very heavy shocks, and which will afford three successive stages of yielding resistance, the second several times the capacity of the first and the third several times the capacity of the second.

My invention consists in a combined spring and friction buffer having a primary spring element, preferably of about 4,000 or 5,000 pounds capacity; a secondary spring element preferably of about six times the capacity of the primary spring element and preferably comprising a group of three large springs arranged horizontally side by side, and each with a small spring nested within it, and against which secondary spring element the primary spring element reacts in tandem arrangement so that the light shocks may be chiefly absorbed and cushioned by the primary spring element, and the heavier or medium shocks absorbed and cushioned chiefly by the secondary spring element; and a friction cushion element comprising a longitudinally movable friction shell and friction shoes and wedge within the shell, interposed between the primary spring element and the secondary spring element, the friction cushion element being preferably of from three to six times the capacity of the secondary spring element; a spring cage to receive the several springs of the secondary spring element; a bearing plate for said springs interposed between the secondary spring element and the friction shoes; and a thrust member interposed between the buffer bar and wedge.

All these parts are so combined that the buffer bar may have an initial or first stage movement, preferably of about $2\frac{1}{4}$ inches for cushioning light blows by the primary spring element before the thrust member, interposed between the buffer bar and the wedge, comes in contact with the wedge; then a second stage movement, preferably of about 1 inch, during which the wedge and friction shoes and shell move altogether longitudinally with the buffer bar for cushioning medium shocks by the secondary spring element, before the longitudinally movable friction shell comes in contact with the spring cage of the secondary spring element; and then a third or final stage movement, preferably of about $2\frac{1}{4}$ inches for cushioning very heavy shocks by the combined action of the friction cushioning element and of the secondary spring element and during which third stage movement of the buffer bar the friction shoes under the spreading action of the wedge slide longitudinally in the friction shell and thus cause the powerful secondary springs to be further or fully compressed.

In the accompanying drawing forming a part of this specification, Figure 1 is a side elevation, partly in central, vertical, longitudinal section of a combined spring and friction buffer embodying my invention. Fig. 2 is a plan view, partly in horizontal section on line 2—2 of Fig. 1. Fig. 3 is a vertical cross section on line 3—3 of Fig. 1. Fig. 4 is a detail, vertical, longitudinal section of the cushioning mechanism showing the same after the primary spring has been compressed and the longitudinally movable friction shell moved into engagement with the spring cage of the secondary spring element. Fig. 5 is a similar view to Fig. 4, but showing the cushioning mechanism fully compressed. Figs. 6, 7, 8 and 9 are detail cross sections on lines 6—6, 7—7, 8—8 and 9—9, respectively of Fig. 4.

In the drawing, 1 represents a portion of the front end frame of a railway passenger car, 2 the buffer frame or cradle, 3 the steel floor plate of the vestibule of the car, preferably secured to and supported by the buffer frame or cradle 2, 4 the buffer plate, 5 the buffer bar, all of which may be of any desired or suitable form.

The primary spring element preferably consists of a single spring surrounding the thrust member 7 which is interposed between the buffer bar 5 and the wedge 8 of the friction cushioning element. The thrust member 7 is furnished with a cylindrical wall 9 to surround the spring 6 and for engagement with the front end of the friction shell when the entire cushioning mechanism is full compressed, and thus serve as a stop to protect the spring cushioning elements and friction cushioning element from injury. The friction shoes 11 are preferably three in number and fit inside the longitudinally movable friction shell 10. Anti-friction rollers 12 are interposed between the inclined faces of the friction shoes and wedge.

The secondary spring element preferably comprises a group of three large springs 13 arranged horizontally side by side and each is preferably furnished with a small spring 14 nesting within it. The secondary springs 13, 14 fit at one end in a spring cage 15 and at their other end within wings or extensions 16, 17 with which the friction shell 10 is preferably provided at its rear end. A bearing plate 18 is interposed between the springs 13, 14 and the friction shoes 11, the bearing plate 18 having a cylindrical boss or member 19 which fits within the friction shell 10, thus transmitting the pressure of the secondary springs to the friction shoes when the friction shoes move longitudinally in the friction shell, both in the buffing or compressing movement and in the release movement. Bolts 20 serve to connect the spring cage 15 with the friction shell 10, these bolts extending through the bearing plate 18;
and a bolt or rod 21 extending through the bearing plate 18, wedge 8 and thrust member 7 connects all the parts together and holds them in assembled and coöperative relation.

The buffer frame or cradle 2 is furnished with an opening 22 large enough for the insertion of the cushioning mechanism of the buffer and the same is closed by a removable supporting plate 23 which is secured in position by bolts 24 having threaded nuts 25. A U shaped housing or wide strap 26 surrounds the cylindrical wall of the thrust member 7 and the cylindrical portion of the longitudinally movable friction shell 10 to secure the cushioning mechanism in position in line with the buffer bar. The housing or strap 26 is secured in place by the bolts 24.

In operation, during the first stage of rearward movement of the draw-bar, the primary spring 6 is compressed until the rear end of the thrust member 7 comes in contact with the front end of the wedge 8, and during this first stage of movement, the secondary buffer springs against which the primary buffer spring reacts through the interposed friction shoes, friction shell and bearing plate 18 are also slightly compressed. Then the thrust member 7, being in engagement at its rear end with the front end of the wedge 8, the further or second stage rearward movement of the buffer bar causes the wedge, friction shoes and friction shell to all move rearward together, thus further compressing the powerful secondary springs 13, 14 until the rear end of the longitudinally movable friction shell 10 comes into engagement with the front end of the spring cage 15 of the secondary springs, thus causing the powerful secondary springs to cushion medium shocks by the partial compression of said springs. And then at the final or third stage movement of the buffer bar, the friction cushioning mechanism is brought into action, the thrust member 7 causing the wedge and friction shoes to slide longitudinally within the friction shell, thus further or fully compressing the secondary springs 13, 14 and exerting a very high or powerful spring and frictional resistance.

I claim:—

1. In a combined spring and friction buffer for railway cars, the combination with a primary spring, of secondary springs, a cage for said secondary springs, a longitudinally movable friction shell, friction shoes and wedge within the shell, a bearing plate between said secondary springs and the friction shoes and a thrust member between the draw-bar and the wedge, the movement of the draw-bar being cushioned in three stages, firstly by the primary spring, secondly by the secondary springs and thirdly by the friction shoes and shell in coaction with the secondary springs, substantially as specified.

2. In a combined spring and friction buffer for railway cars, the combination with a primary spring, of secondary springs, a cage for said secondary springs, a longitudinally movable friction shell, friction shoes and wedge within the shell, a bearing plate between said secondary springs and the friction shoes and a thrust member between the draw-bar and the wedge, the movement of the draw-bar being cushioned in three stages, firstly by the primary spring, secondly by the secondary springs and thirdly by the friction shoes and shell in coaction with the secondary springs, said thrust member engaging the wedge after the first stage of the cushioning movement, said longitudinally movable friction shell engaging the spring cage after the second stage of cushioning movement and the friction shoes sliding in the friction shell at the third stage of cushioning movement, substantially as specified.

3. In a combined spring and friction buffer for railway cars, the combination with a primary spring, of secondary springs, a cage for said secondary springs, a longitudinally movable friction shell, friction shoes and wedge within the shell, a bearing plate between said secondary springs and the friction shoes and a thrust member between the draw-bar and the wedge, the movement of the draw-bar being cushioned in three stages, firstly by the primary spring, secondly by the secondary springs and thirdly by the friction shoes and shell in coaction with the secondary springs, said friction shell having rearward and lateral extensions embracing one end of said secondary springs, substantially as specified.

4. In a combined spring and friction buffer for railway cars, the combination with a primary spring, of secondary springs, a cage for said secondary springs, a longitudinally movable friction shell, friction shoes and wedge within the shell, a bearing plate between said secondary springs and the friction shoes and a thrust member between the draw-bar and the wedge, the movement of the draw-bar being cushioned in three stages, firstly by the primary spring, secondly by the secondary springs and thirdly by the friction shoes and shell in coaction with the secondary springs, said friction shell having rearward and lateral extensions embracing one end of said secondary springs, connecting rods extending between said spring cage and said friction shell and a connecting rod extending between said thrust member and said bearing plate, substantially as specified.

JOHN F. O'CONNOR.

Witnesses:
EDMUND ADCOCK,
PEARL ABRAMS.